US007016937B1

(12) United States Patent
Malik

(10) Patent No.: US 7,016,937 B1
(45) Date of Patent: Mar. 21, 2006

(54) METHOD AND APPARATUS FOR GENERATING REMINDERS TO TRANSMIT ELECTRONIC MAIL ATTACHMENTS BY PARSING E-MAIL MESSAGE TEXT

(75) Inventor: Dale W. Malik, Dunwoody, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/563,927

(22) Filed: May 4, 2000

(51) Int. Cl.
*G06F 15/16* (2006.01)

(52) U.S. Cl. ...................................... 709/206
(58) Field of Classification Search ............... 709/206, 709/217, 245; 715/530, 531, 540; 707/3–5, 707/10
See application file for complete search history.

(56) References Cited

U.S. PATENT DOCUMENTS

| | | | |
|---|---|---|---|
| 5,375,235 A * | 12/1994 | Berry et al. ................... 707/5 |
| 5,649,222 A | 7/1997 | Mogilevsky | |
| 5,781,901 A | 7/1998 | Kuzma ......................... 707/10 |
| 5,796,948 A | 8/1998 | Cohen ...................... 395/200.36 |
| 5,819,260 A * | 10/1998 | Lu et al. ......................... 707/3 |
| 6,012,075 A | 1/2000 | Fein et al. | |
| 6,026,410 A * | 2/2000 | Allen et al. .............. 707/104.1 |
| 6,057,841 A | 5/2000 | Thurlow et al. ............ 345/347 |
| 6,073,133 A * | 6/2000 | Chrabaszcz .................. 707/10 |
| 6,199,103 B1 * | 3/2001 | Sakaguchi et al. .......... 709/206 |
| 6,212,553 B1 | 4/2001 | Lee et al. .................... 709/206 |
| 6,349,295 B1 * | 2/2002 | Tedesco et al. ................. 707/3 |
| 6,356,937 B1 | 3/2002 | Montville et al. ........... 709/206 |
| 6,377,949 B1 * | 4/2002 | Gilmour ....................... 707/10 |
| 6,405,225 B1 | 6/2002 | Apfel et al. ................. 707/526 |
| 6,453,338 B1 * | 9/2002 | Shiono ........................ 709/206 |
| 6,460,074 B1 | 10/2002 | Fishkin ....................... 709/206 |
| 6,505,237 B1 | 1/2003 | Beyda et al. ............... 709/206 |
| 6,507,865 B1 | 1/2003 | Hanson et al. ............. 709/206 |

OTHER PUBLICATIONS

PTO-892, provided by examiner for: 09/563,930.
Introduction to Microsoft Outlook; revised Feb. 1998 (SMC), total pages-36.
S. Mosher; "Receiving and Responding to E-Mail Messages"; Published Feb. 1997 by Duke Press; 6 pages.
S. Mosher; "Sending E-Mail Messages (view...table of contents)"; Published Feb. 1997 by Duke Press; 3 pages.
S. Mosher; "Sending E-Mail Messages (Inserting Files... Objects)"; Published Feb. 1997 by Duke Press; 5 pages.
S. Mosher; "Sending Email Messages with Outlook (Abstract)"; Published Jan. 1998 by 29th Street Press; 5 pages.

* cited by examiner

*Primary Examiner*—William A. Cuchlinski, Jr.
*Assistant Examiner*—Joseph Maniwang
(74) *Attorney, Agent, or Firm*—Thomas, Kayden, Horstemeyer & Risley

(57) ABSTRACT

The present invention is a method and apparatus for reminding a user to include an e-mail attachment file with an e-mail communication. A user is reminded to include an attachment file by being prompted within the e-mail application when the text of the user's e-mail message indicates the user's intent to send an e-mail attachment.

11 Claims, 5 Drawing Sheets

METHOD AND APPARATUS FOR GENERATING REMINDERS TO TRANSMIT ELECTRONIC MAIL ATTACHMENTS BY PARSING E-MAIL MESSAGE TEXT

FIELD OF THE INVENTION

The present invention relates to the transmission of electronic mail over computer networks, and more particularly, to a method and apparatus for reminding the user to transmit attachments in electronic mail.

DESCRIPTION OF THE RELATED ART

During the past decade, electronic mail ("e-mail") has become an indispensable tool for facilitating business and personal communications. Through computer networking systems such as local-area networks ("LAN"), wide-area networks ("WAN"), and the world-wide web ("WWW"), network users can send and receive notes, messages, letters, etc., to communicate with others who are in the same office or perhaps in remote locations across the world.

E-mail application programs are typically configured for generating messages in the form of memoranda. These programs guide a user to "compose" an e-mail message by providing a platform for entering at least one outgoing e-mail address, a "subject" heading, and a "body" for the actual message. When the user completes typing the message and presses the "send" key, the message is transmitted over the network and arrives at the provided destination address. E-mail is often used for sending relatively short messages that are only a few sentences in length.

Most e-mail application programs also allow a user to attach a file to be sent along with a message as an "attachment." In the accompanying e-mail message, the sender may introduce or explain the significance of the attachments. Attachment files might include word processing documents, graphics files, executable programs, spreadsheet reports, etc. A recipient will receive the e-mail message plus any attached files, which may then be opened and accessed through the appropriate application software. In many applications, it is preferable to send documents through e-mail attachments instead of a facsimile because the recipient can then store, edit, and print an original file. For long-distance communications, it is also less costly to send documents via e-mail as compared with a facsimile.

In order to send an attachment with most e-mail application programs, a user first composes a message in the ordinary course by specifying a destination address, a subject heading, and a message. The user then selects the "attachment" icon and selects a file that is stored in memory or on floppy disk. Upon selecting a file and selecting the "ok" icon, the user finally selects the "send" option to begin transmission of the e-mail.

Although many currently available e-mail application programs enable a user to send attachments to messages as part of an e-mail communication, there are problems that users often encounter when sending e-mail attachment files. Particularly, it is relatively common for a user to forget to send an attachment along with a message when composing an e-mail. In some circumstances, this can lead to confusion, or at least embarrassment because the user referred in the sent message to an attached file that has not been sent. These problems significantly reduce the benefits of e-mail systems and may negatively affect a user's productivity when engaging in electronic mail communications.

SUMMARY OF THE INVENTION

In view of the difficulties encountered with sending attachments to e-mail communications described above, there is a need for a method and apparatus for reminding a user to properly configure an e-mail communication to include the transmission of a desired attachment file.

In accordance with the present invention, a user can be reminded to include an attachment file by being prompted within the e-mail application when the text of the user's e-mail message indicates the user's intent to send an e-mail attachment.

The present invention provides a method for automatically checking an e-mail message in an e-mail communication for an indicator that a user intends to transmit an e-mail attachment. A list of trigger terms are stored in memory. The text of the e-mail message is checked for the presence of any of the trigger terms. Upon detecting the presence of any of the trigger terms and the absence of an e-mail attachment file, the user is prompted to add an e-mail attachment file to the e-mail communication.

The present invention also provides a system for automatically checking an e-mail message in an e-mail communication for an indicator that a user intends to transmit an e-mail attachment. The system includes a memory for storing a list of trigger terms. A language parser checks the e-mail message for the presence of any of the stored trigger terms. A user interface prompts the user to add an e-mail attachment file to the e-mail communication upon detecting the presence of any of the trigger terms.

DETAILED DESCRIPTION OF THE PREFERRED EMBODIMENTS

Figure 1:
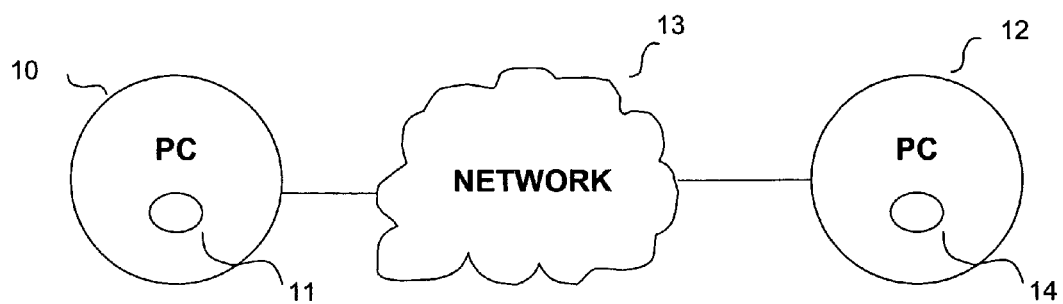
FIG. 1 is a schematic diagram of a basic computer network system in accordance with an embodiment of the present invention.

The present invention will now be described in more detail with reference to the figures. FIG. 1 is a schematic diagram of a basic computer network system in accordance with a preferred embodiment of the present invention, in which computer 10 is connected to computer 12 through a network 13 to facilitate e-mail communications with attachments. Computer 10 has an e-mail communications user interface 11 that permits the computer to send e-mail communications using network 13. Likewise, computer 12 has an e-mail communications user interface 14 that permits the computer to receive e-mail communications from network 13. The term computer in this description is not limited to any particular type of computer, and may include computer systems having many computers, or only a portion of a computer. Network 13 can be in the form of a wired network or a wireless network. The network may be a simple, single communication path, or it may include one or several LAN(s) or WAN(s), the world wide web, or any combination thereof. Computers 10 and 12 may be the only computers connected to the network 13, or the network may be shared by many other computers.

Figure 2:
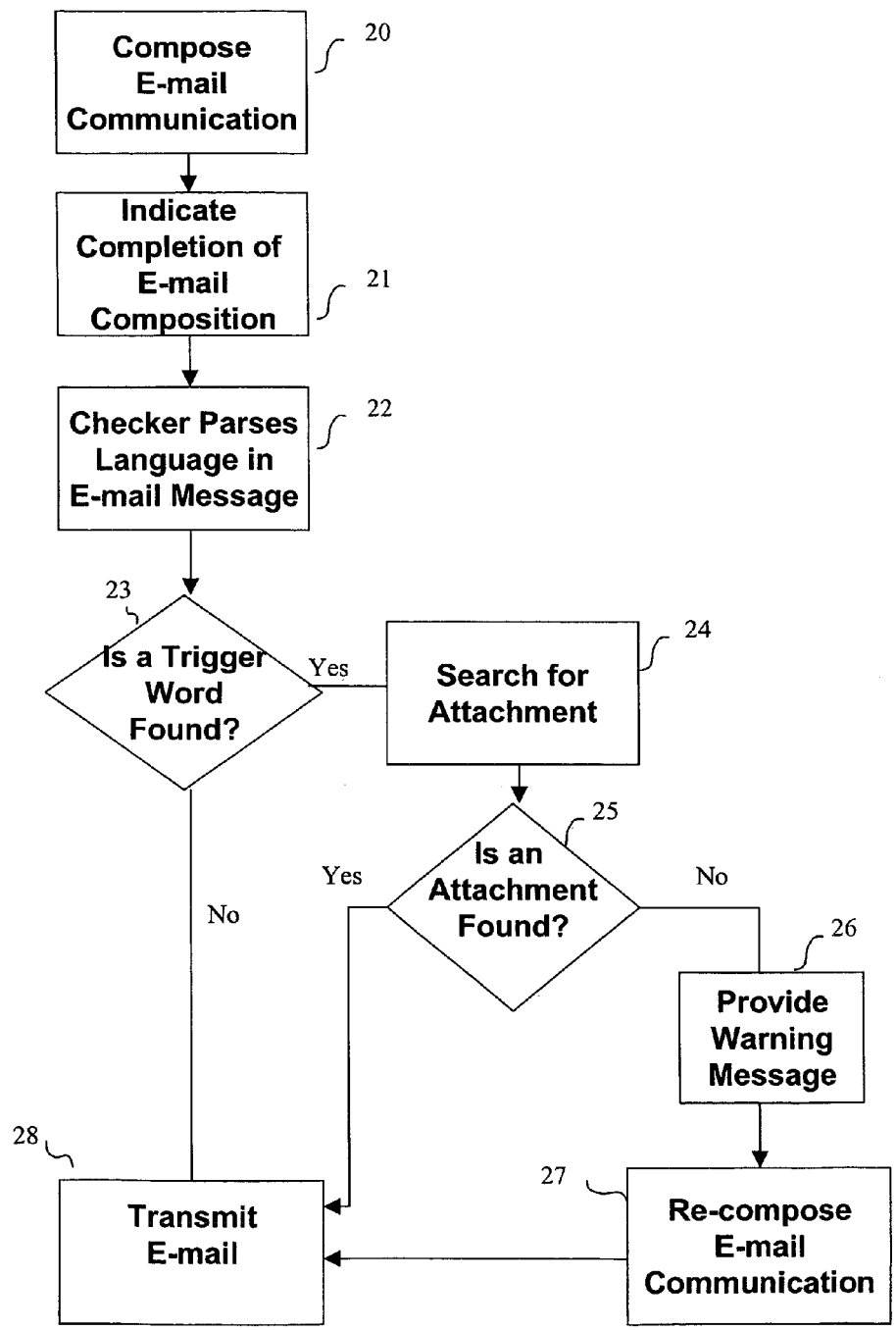
FIG. 2 is a flow diagram of an e-mail communication consistency checker according to an embodiment of the present invention.

According to a first embodiment of the present invention, as shown in FIG. 2, the e-mail application program operating in computer 10 performs a checking operation before the e-mail is forwarded via network 13 to computer 12. As in conventional e-mail application programs, the user composes an e-mail communication in accordance with a template provided by the application, shown as step 20. To indicate the completion of the composition of the message, the user selects a "SEND" icon on the screen, shown as step 21, to indicate that the e-mail is to be transmitted from the user's computer. Of course, this icon could possibly be labelled by one of several other indicators, such as "TRANSMIT," "OKAY," "OK," "DONE," or the like. Once this icon is selected, a checking system performs an e-mail attachment consistency analysis. The e-mail application program first parses through the language provided by the user in the e-mail message, shown as step 22. The system searches for trigger words or phrases such as "ATTACHED," "ENCLOSED," "HERE IT IS," "AS PROMISED," "VERSION," or the like. In step 23, the system determines whether one of the words or phrases is present. If the system does not detect the presence of one of these words or phrases, the e-mail communication is transmitted to network 13, shown as step 28.

If the system detects one or more of the words or phrases identified above, a consistency checker first searches for an attachment file that is to be sent along with the e-mail message, shown as step 24. The system next determines in step 25 whether the user provided an attachment file. If an attachment file exists, the e-mail communication is transmitted to the network 13, as shown in step 28. However, if no attachment file exists, the e-mail application program interrupts the user with a warning message, shown as step 26. The user is then asked whether an attachment file was intended to be placed along with the e-mail message. The user can alter the e-mail message or add or remove attachment files, and then send the e-mail communication, shown as step 27. This communication is then transmitted to the network 13, in step 28.

Figure 3:
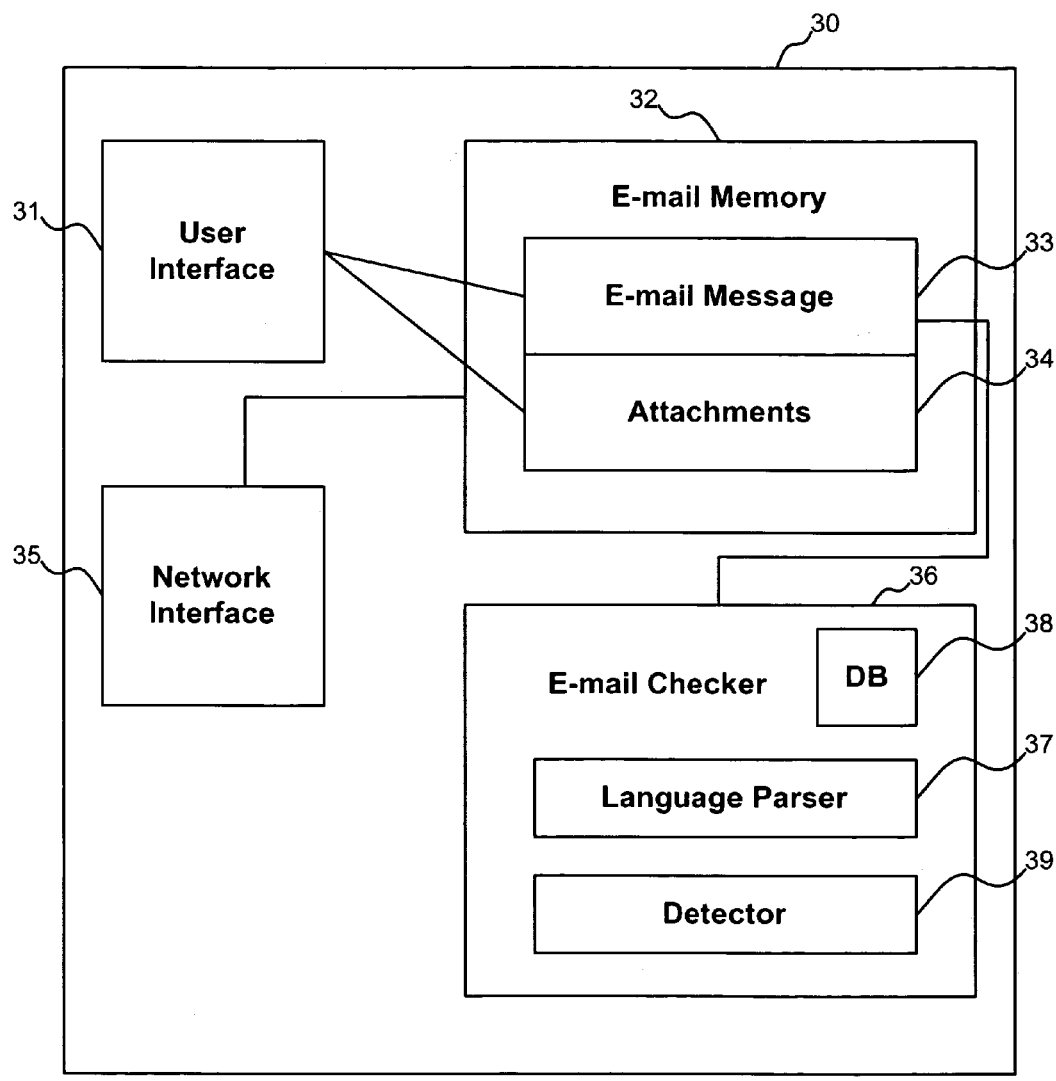
FIG. 3 is a schematic of the e-mail communication consistency checker according to an embodiment of the present invention.

FIG. 3 illustrates a schematic of the e-mail communication consistency checker according to the preferred embodiment. The e-mail application in computer 30 includes a user interface 31 for entering an e-mail communication to be transmitted. An e-mail memory 32 temporarily stores an e-mail message 33 and one or more, if any, attachment files 34. A network interface 35 prepares the e-mail communication for transmission along the network. An e-mail checker 36 performs the consistency checking, and includes a language parser 37 for analyzing a composed e-mail message. A memory 38 in the e-mail checker stores a list of the terms or phrases that indicate a user's intention to transmit an attachment file in an e-mail communication. A detector 39 in the e-mail checker determines whether the e-mail communication to be transmitted includes an attachment.

Figure 4:
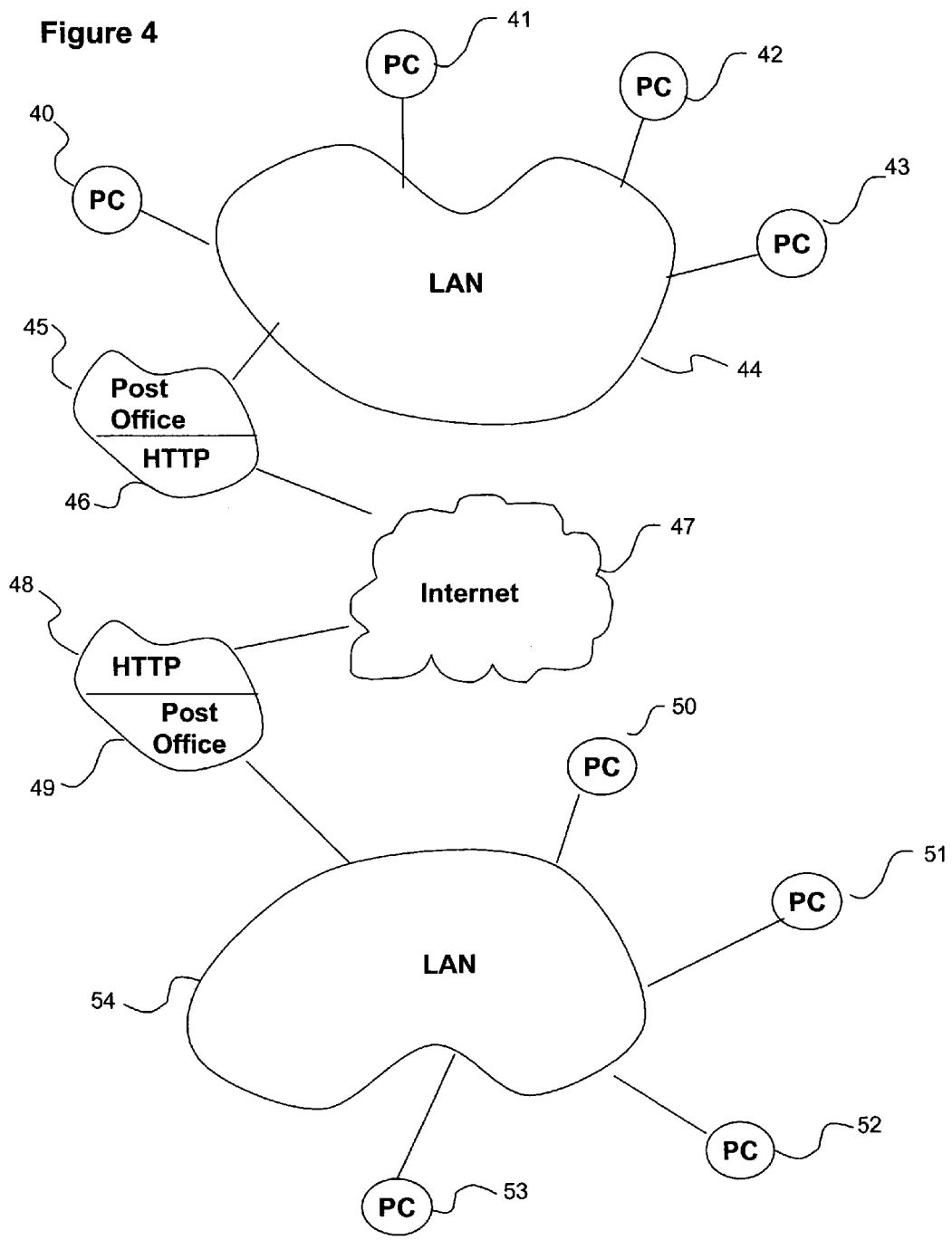
FIG. 4 is a schematic diagram of a network system in accordance with an embodiment of the present invention.

FIG. 4 is a schematic diagram of another networked computer system in accordance with a preferred embodiment of the present invention, wherein an e-mail communication with an attachment is transmitted from computer 40 to computer 50 via the Internet 47. Computers 40, 41, 42, and 43 are connected together via LAN 44. Post office server 45 connects to LAN 44 for transmitting e-mail both within and outside the LAN network. A world wide web hyper text transport protocol ("HTTP") server 46 ("web server") is also connected to the LAN 44 for facilitating communication between any of the computers 40, 41, 42, and 43 with other computer systems via the internet 47. Likewise, computers 50, 51, 52, and 53 are connected together through LAN 54, which is also connected to a post office server 49 and web server 48.

A user stationed at computer 40 sends an e-mail communication by composing a message and/or an attachment, along with one or more destination addresses, using an e-mail application program compatible with LAN 44. Before the e-mail communication is transmitted along LAN 44, the consistency checker 36 of FIG. 3 checks whether the user had likely intended to send an attachment file in the e-mail communication. If language parser 37 in the consistency checker 36 finds words or phrases indicative of an intended attachment file and the system determines that the user failed to attach attachment files in the detector 39, the e-mail communication is interrupted at computer 40 to provide an opportunity for the user to correct and mistakes in the e-mail communication. Once the user indicates that the e-mail communication is complete, it is then sent from computer 40 through LAN 44 to post office server 45. A post office server maintains a directory of the users on the LAN and stores the incoming and outgoing e-mail for these users. If the destination address provided in the e-mail communication is for a remote destination, the post office server 45 routes the e-mail to web server 46. The message is then sent via the Internet 47 to web server 48, and forwarded to post office server 49. Through a local e-mail application program, the e-mail communication is then transmitted across LAN 54 from post office server 49 to computer 50. A user accessing computer 50 can then access the e-mail communication as incoming electronic mail.

Accordingly, the e-mail consistency checker provides a reminder to the user, before the transmission of an e-mail communication, when it is likely that the user has mistakenly omitted an e-mail attachment file from the e-mail communication to be sent. The language parser 37 stores the most commonly used terms and phrases that typically indicate that a user intends to include an e-mail attachment along with an e-mail message. Although there may be circumstances in which the user is unnecessarily prompted with a warning message, this slight inconvenience is greatly outweighed by the increased efficiency experienced by the user. The system significantly reduces the possibility that a recipient user will send e-mail communications without a desired attachment.

The e-mail application program can additionally incorporate an adaptive learning module to update trigger terms or phrases in the e-mail checker. The adaptive learning module updates the database in the language parser by adding or deleting words or phrases based upon a rolling analysis of the user's e-mail communications history at the computer. If the user often uses a particular term or phrase when composing an e-mail message that triggers an unfounded warning message, the term or phrase may not be appropriate as a trigger for the given user, and can be deleted. Conversely, if the adaptive learning module detects the presence of certain words or phrases in the user's messages that are often used when an attachment file is a part of the e-mail communication, it adds these words or phrases to the database in the language parser. The modules may optionally query the user periodically as to whether a certain term or phrase is appropriate for storage in the language parser.

Figure 5:
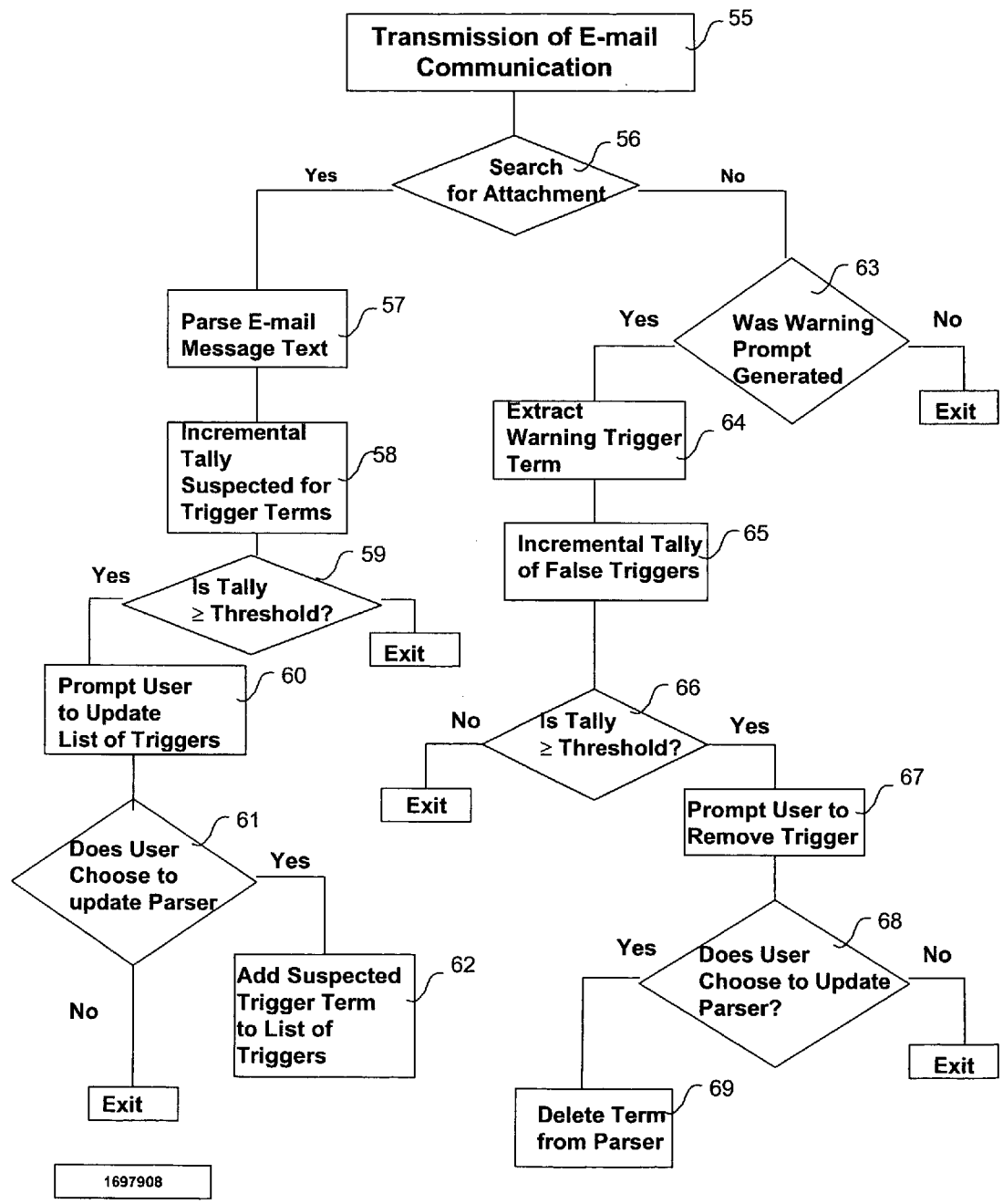
FIG. 5 is a flow diagram of an adaptive learning component of the e-mail consistency checker of the present invention.

The operation of the present invention with an e-mail consistency checker adaptive learning module is illustrated in FIG. 5. Once an e-mail communication is transmitted from a personal computer to the network, as in step 55, the system detects whether an attachment was sent, in step 56. If an attachment was sent, the module parses the e-mail communication message to look for suspected terms or phrases that may be indicative of the user's intention of sending an attachment, as in step 57. The suspected terms or phrases are derived from a grammar-based algorithm that excludes words that could not conceivably refer to an attachment. For each occurrence of a suspected term or phrase, the module updates a tally or percentage calculation for that term, in step 58. If the tally for any suspected term is greater than a certain percentage, in step 59, a message is generated to suggest adding that suspected term to the database in the language parser, in step 60. If the user wishes to add the term or phrase, in 61, the parser database is then updated, in step 62.

If the e-mail communication that is sent does not contain an attachment file, the system tests whether a warning message had been generated. The system then checks whether the user made any changes to the e-mail communication in response to the warning message to determine if the warning consistuted a false trigger, in step 63. If the warning message was unnecessarily produced, the module extracts the term or phrase that triggered the warning, in step 64. The module then tallies the number of times that the term created a false trigger, or the percentage of times that the term caused a false trigger, in step 65. If the tally is beyond a predetermined threshold, as determined in step 66, the system generates a message to the user requesting authorization to update the database by removing the term from the language parser, in step 67. If the user chooses to update the parser, in step 68, the language is deleted from the parser in step 69.

Accordingly, the e-mail communication consistency checker and the checker with adaptive learning can assist the user in minimizing the occurrences of e-mail communications that would otherwise have been incorrectly sent.

Thus, it is readily seen that the method and system of the present invention provides for improved e-mail communications when e-mail attachments are to be transmitted from the user's computer to another. The system detects when the user intends to send an e-mail attachment, and reminds the user to configure an e-mail attachment prior to the transmission of the e-mail communication.

The foregoing disclosure of embodiments of the present invention and specific examples illustrating the present invention have been present for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

What is claimed is:

1. A method for automatically checking an e-mail message in an e-mail communication for an indicator that a user intends to transmit an e-mail attachment, comprising the steps of:

storing a list of trigger terms in a memory;

checking text in an e-mail message for the presence of any of the trigger terms;

prompting the user to edit the e-mail message to remove a reference to an e-mail attachment upon detecting a trigger term in an e-mail communication without an attachment;

storing in the memory, separate from the list of trigger terms, a second list of terms found in at least one e-mail message of an e-mail communication having at least one attachment;

storing in the memory, for each of the terms stored in the second list, a second value associated with the number of times that an e-mail message in an e-mail communication having at least one attachment includes the term in the second list;

incrementing the second value associated with the term in the second list for each occurrence of an e-mail message in an e-mail communication having at least one attachment that includes the term in the second list; and prompting the user to add the term from the second list to the list of trigger terms when the second value associated with the term exceeds a predetermined threshold.

2. The method of checking an e-mail message of claim 1, further comprising the step of providing a template for the user to compose an e-mail message, the template providing an icon for the user to select to transmit the e-mail message.

3. The method of checking an e-mail message of claim 2, wherein the step of checking text in the e-mail message occurs after the user selects the icon.

4. The method of checking an e-mail message of claim 1, further comprising the steps of:

storing in the memory, for each trigger term in the memory, a value associated with the number of times that the user declined to add an attachment in response to a prompt to add an e-mail attachment file generated upon detecting the presence of the trigger term;

detecting whether the user adds at least one attachment file to the e-mail communication in response to the prompt to add an attachment;

incrementing the value associated with the trigger term when the user declines to add an attachment in response to the prompt; and prompting the user to remove the trigger term from memory when the associated value exceeds a predetermined threshold.

5. The method of checking an e-mail message of claim 4, wherein the value indicates the number of times that the user declined to add an attachment in response to the prompt generated upon detecting the presence of the trigger term.

6. The method of checking an e-mail message of claim 4, wherein the value is derived from the percentage of times that the user declined to add an attachment in response to the prompt generated upon detecting the presence of the trigger term.

7. The method of checking an e-mail message of claim 1, wherein the value associated with a respective term in the second list is incremented when the e-mail communication includes at least one attachment, and the corresponding e-mail message does not include a trigger term.

8. The method of checking an e-mail message of claim 7, wherein the value indicates the number of times that the term listed in the second list was present in the e-mail message when the user also included an attachment to the e-mail communication.

9. The method of checking an e-mail message of claim 7, wherein the value is derived from the percentage of times that the term in the second list is present in the e-mail message when the user also includes an attachment to the e-mail communication.

10. A system for automatically checking an e-mail message in an e-mail communication for an indicator that a user intends to transmit an e-mail attachment, comprising:
a memory for storing a list of trigger terms;
a language parser for checking text in the e-mail message for the presence of any trigger terms;
a user interface for prompting the user to add an e-mail attachment file to the e-mail communication upon detecting the presence of any trigger terms, wherein, for each trigger term, a value associated with the number of times that the user declined to add an attachment in response to a prompt generated upon detecting the presence of any of the trigger terms;
a detector for detecting whether the user adds at least one attachment file to the e-mail communication in response to the prompt to add an attachment, and for incrementing the value associated with the term when the user declines to add an attachment in response to the prompt,
wherein the user interface prompts the user to remove the trigger term from the memory when the associated value exceeds a predetermined threshold;
a second list of terms stored in a memory, wherein the terms are from at least one e-mail message of an e-mail communication having at least one attachment without a trigger term in the e-mail message; and
for each term in the second list, a value associated with the number of times that the user composed an e-mail message that included the term from the second list and included an attachment to the e-mail communication,
wherein the value is incremented for each occurrence of the term from the second list when the user also includes an attachment to the e-mail communication, and wherein the user interface prompts the user to add the term from the second list to the list of trigger terms when the associated value exceeds a predetermined threshold.

11. The system of claim 10, further comprising:
a language parser for checking each word in the text of an e-mail message in an e-mail communication for any terms in a predefined vocabulary; and
a display device in communication with the language parser for generating a user prompt in the e-mail communications system in response to detecting a term in the predefined vocabulary,
wherein the user prompt includes prompting a user to edit the e-mail message to remove a reference to an e-mail attachment upon detecting a trigger term in an e-mail communication without an attachment.

* * * * *